United States Patent [19]
Siegner et al.

[11] Patent Number: 5,181,589
[45] Date of Patent: Jan. 26, 1993

[54] REVERSIBLE IMPACT DAMPER, IN PARTICULAR FOR VEHICLES

[75] Inventors: Helge Siegner, Altdorf-Röthenbach; Edgar Prottengeier, Nürnberg, both of Fed. Rep. of Germany

[73] Assignee: Suspa Compart AG, Altdorf, Fed. Rep. of Germany

[21] Appl. No.: 755,902

[22] Filed: Sep. 6, 1991

[30] Foreign Application Priority Data

Sep. 7, 1990 [DE] Fed. Rep. of Germany ....... 4028448

[51] Int. Cl.⁵ .............................................. F16F 7/12
[52] U.S. Cl. .............................. 188/374; 188/268; 267/140.13; 267/201; 293/133; 293/136
[58] Field of Search ............... 267/140.1 R, 182, 201; 188/371, 374, 268; 293/133, 136

[56] References Cited

U.S. PATENT DOCUMENTS

| | | | |
|---|---|---|---|
| 3,053,526 | 9/1962 | Kendall | 188/268 X |
| 3,298,465 | 1/1967 | Stastny . | |
| 3,394,612 | 7/1968 | Bogosoff et al. . | |
| 3,428,150 | 2/1969 | Muspratt et al. . | |
| 3,479,902 | 11/1969 | Okamoto | 188/371 X |
| 3,511,345 | 5/1970 | Takamatsu et al. | 188/371 |
| 3,696,891 | 10/1972 | Poe | 188/268 |
| 3,715,139 | 2/1973 | Tuggle | 188/268 X |
| 3,717,224 | 2/1973 | Leach et al. | 188/268 X |
| 3,887,223 | 6/1975 | Bez . | |
| 3,899,047 | 8/1975 | Maeda et al. . | |
| 4,031,978 | 6/1977 | Taylor | 293/133 X |
| 4,272,114 | 6/1981 | Hirano et al. . | |
| 4,445,708 | 5/1984 | Oakes et al. | 188/371 X |
| 4,537,374 | 8/1985 | Barnoin et al. . | |
| 4,995,486 | 2/1991 | Garneweidner . | |

FOREIGN PATENT DOCUMENTS

| | | |
|---|---|---|
| 6908254 | 2/1969 | Fed. Rep. of Germany . |
| 2222885 | 11/1973 | Fed. Rep. of Germany . |
| 2441557 | 3/1976 | Fed. Rep. of Germany . |
| 2149759 | 5/1983 | Fed. Rep. of Germany . |
| 3419165 | 8/1988 | Fed. Rep. of Germany . |
| 2129258 | 10/1972 | France . |
| 1231292 | 5/1971 | United Kingdom . |
| 1300665 | 12/1972 | United Kingdom . |

Primary Examiner—George E. A. Halvosa
Attorney, Agent, or Firm—Browdy and Neimark

[57] ABSTRACT

A reversible impact damper is in series with an additionally provided irreversible deformation damper. The impact damper is a usual solid damper. The deformation damper has a deformation piston bearing against a piston rod of the impact damper on the one hand and on the other hand against crimps, which are formed in the wall of a slide tube displaceable relative to the housing of the impact damper and which are deformable.

8 Claims, 2 Drawing Sheets

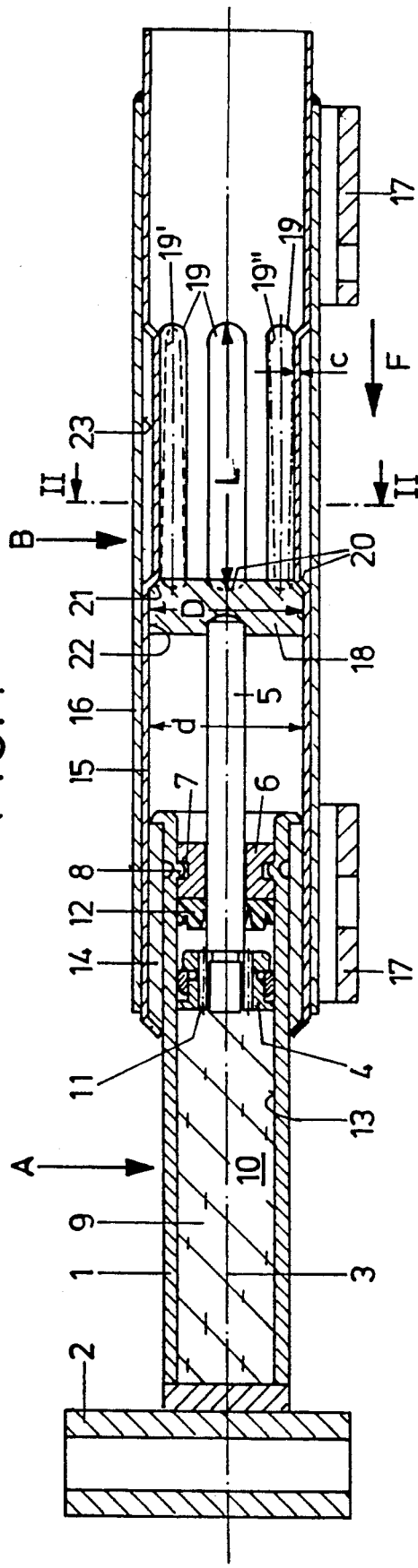
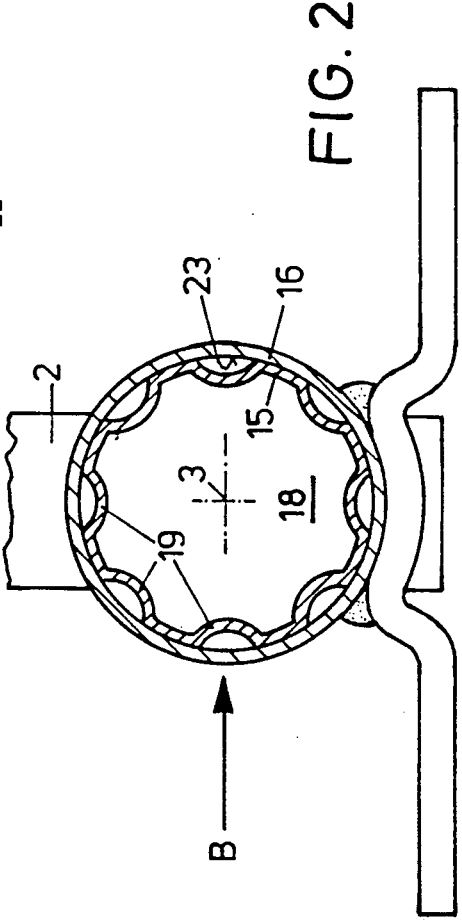

REVERSIBLE IMPACT DAMPER, IN PARTICULAR FOR VEHICLES

FIELD OF THE INVENTION

The invention relates to a reversible impact damper, in particular for vehicles, with a housing filled with a damping medium, in particular a compressible solid, in which housing a piston rod is arranged to be displaceable in the direction of a central longitudinal axis of the housing, securing elements being associated with the housing on the one hand and with the piston rod of the other hand for the introduction of forces to be absorbed.

BACKGROUND OF THE INVENTION

Impact dampers of the generic type have been disclosed for instance by DE 21 49 759 C3. In principle, these known dampers are formed as conventional hydraulic dampers, i.e. they have a cylindrical housing closed at one end, in which a damping piston with damping channels is arranged for axial displacement and is secured to one end of a piston rod exiting in sealed manner at one end of the cylindrical housing. The compressible solids utilized are such materials as they are known from U.S. Pat. No. 3,053,526 or as they are commercially available under the trade name "Silastic" of Dow-Corning Corporation, U.S.A. When the piston rod enters, their volume is displaced, i.e. the compressible solid is compressed by the penetrating volume of the piston rod. Simultaneously the solid is pressed through the damping channels of the piston, as a result of which extraordinary damping occurs. The damping channels can also be formed by an annular gap between the piston and the internal wall of the housing. The compression of the solid simultaneously pretensions the latter, so that when correspondingly unloaded the piston rod is again pushed out of the housing. Such impact dampers are widely used in practice where they have proved quite a success, in particular when arranged between the bumper bar and the frame of a vehicle. In practice, they can as a rule absorb a crash of the vehicle on an obstacle up to a spaed of about 8 kmh in reversible manner, i.e. without any deformations and damages being caused to the vehicle.

German patent 34 19 165 discloses an impact damper having on the one hand a gas spring and on the other hand a hydraulic damper arranged in a cylindrical housing, in both of which a damping piston with a tubular piston rod is arranged. Hydraulic damping takes place through a throttle stationarily arranged in the housing. The hydraulic crash damping and the damping through the gas spring are reversible. So as to achieve an additional absorptive effect after termination of the full working stroke of the piston, the latter's tubular piston rod is provided with a predetermined buckling point, so that when a predetermined energy to be damped is exceeded, the tubular piston rod is destroyed absorbing corresponding deformation energy. This impact damper is comparatively expensive and long.

SUMMARY OF THE INVENTION

It is the object of the invention to embody an impact damper of the generic kind such that while being simple in construction and compact of structure it ensures a reliable absorption of forces exceeding the forces to be reversibly absorbed.

In accordance with the invention this object is attained in that, with its end located outside the housing, the piston rod bears against a deformation damper. The embodiment according to the invention ensures on the one hand to leave the reversible impact damper substantially unchanged. On the other hand it ensures to leave the securing devices associated with the piston practically unchanged in their position. However, it is simultaneously achieved that also considerable forces can be absorbed that exceed the forces to be damped reversibly without any parts of the vehicle being damaged or destroyed.

In particular, the deformation damper according to the invention is very simple and versatile and in a position to dissipate energy irreversibly over a comparatively large additional damping path without the constructional length or the necessary fitting space for the damper being substantially enlarged.

Further advantages, features and details of the invention will become apparent from the ensuing description of an example of embodiment taken in conjunction with the drawing.

BRIEF DESCRIPTION OF THE DRAWING

FIG. 1 is a longitudinal section through a damper,

FIG. 2 is a cross-section through the damper according to the section line II—II in FIG. 1.

DESCRIPTION OF THE PREFERRED EMBODIMENT

Figure 3:
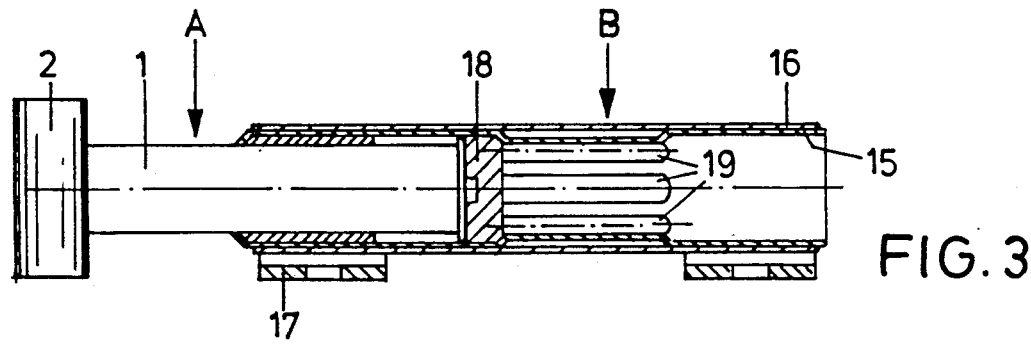
FIG. 3 shows the damper in a reversibly compressed state.

The impact damper A shown in the drawing usually has a cylindrical housing 1, to the one closed end of which a tubular securing element 2 is mounted, by means of which the damper can. for instance be connected with the bumper bar of a vehicle.

A damping piston 4 is arranged in the housing 1 in alignment with the latter's central longitudinal axis 3 and is displaceable in the direction of the axis 3. A piston rod 5 is secured to the piston 4 and is co-axially guided out of the housing 1 by a guidance 6 simultaneously serving as a cover for the housing 1. The guidance 6 is connected with the housing 1 in axially non-displaceable manner by means of a crimp 8 of the housing 1 forced into a circumferential groove 7. The interior chamber 9 of the housing 1 is filled with a compressible solid 10. Such compressible solids are known for instance from U.S. Pat. No. 3,053,526. They are commercially available, for instance under the trade name "Silastic" of Dow-Corning Corporation, USA. They are utilized in crash dampers for automobiles as disclosed by DE 21 49 759 C3. Such compressible solids are reversibly compressible, i.e. their volume decreases under pressure, i.e. their volume decreases the more the higher the pressure is. Upon pressure relief they reassume their original volume. Altogether, they also have corresponding resilient properties.

The damping piston 4 has damping channels 11, through which the solid 10 is forced when the piston rod 5 with the piston 4 is pressed into the housing while generating correspondingly high damping forces. These damping channels 11 are realized in the form of bores. The interior chamber 9 further comprises a double seal 12 arranged upstream of the guidance 6 and sealing off towards the piston rod 5 on the one hand and towards the internal wall 13 of the housing 1 on the other hand. Impact dampers A or solid dampers, as they have been described so far, are known from DE 21 49 759 C3.

In the vicinity of the guidance 6 a guide bush 14 is provided and guided on the exterior circumference of the housing 1 to be displaceable in the direction of the axis 3; a slide tube 15 is arranged on the guide bush 14. This slide tube 15 is surrounded by a suspension tube 16, which is secured to the slide tube 15 for example by welding to be axially non-displaceable. Securing elements 17 in the form of flanges are arranged on the suspension tube 16, by means of which the suspension tube 16 of the damper is secured for instance to the frame of a vehicle.

At the end of the piston rod 5 located opposite the damping piston 4 and outside the housing 1 the piston rod 5 is supported in an abutment plate formed as a deformation piston 18. This abutment plate bears against collar-shaped crimps 19—in particular against their ends 20 facing the housing 1—provided in the wall of the slide tube 15 to project inwards towards the axis 3 and extending in longitudinal direction, i.e. in parallel to the axis 3. While otherwise annular cylindrical in shape the deformation piston 18 bears on these ends 20 by way of a guide bevel 21 tapering towards the axis 3, the outside diameter D of the annular cylindrical exterior circumference 22 of the piston 18 about equalling the inside diameter d of the slide tube 15. With the crimps 19 and the deformation piston 18 the slide tube 15 forms a deformation damper B.

All essential parts consist of metal, i.e. the housing 1, the damping piston 4, the piston rod 5, the deformation piston 18, the securing elements 2, 17 and the suspension tube 16 consist of steel. The slide tube 15, too, consists of metal which must be plastically deformable.

Figure 4:
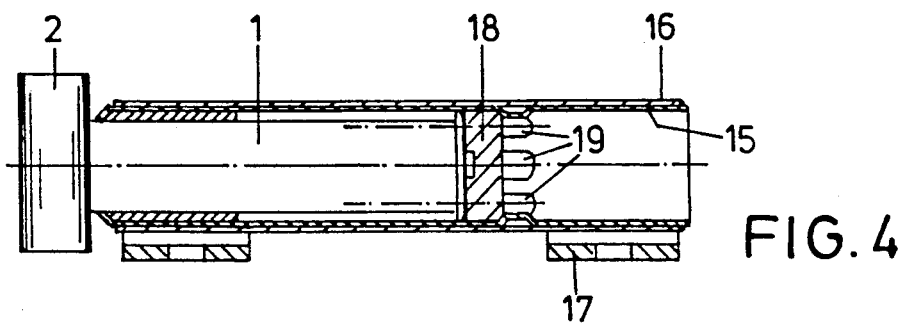
FIG. 4 shows the damper in a partially irreversibly compressed state.

When forces F are applied via the securing elements 2 and 17, which forces F tend to move the piston rod 5 with the piston 4 into the housing 1, then the unit comprising the slide tube 15 and the suspension tube 16 is displaced on the housing 1 in the direction of the axis 3 towards the securing element 2, the piston rod 5 simultaneously pressing the damping piston 4 into the compressible solid 10, whereby reversible damping forces are generated in usual manner. At this the deformation piston 18 does not change its position relative to the slide tube 15. In a borderline case this movement of the piston rod 5 with the piston 4 into the housing 1 goes as far as the position shown in FIG. 3, in which the deformation piston 18 bears against the housing 1. When the impact energy applied to the impact damper A has not yet been used up at this stage, then the deformation piston 18 moves relative to the slide tube 15 in the direction of the crimps 19 as far as the suspension tube 16, whereby the crimps 19 are deformed in the direction towards the internal wall 23 of the suspension tube 16 their inside diameter then corresponding to the outside diameter D of the deformation piston 18. Irreversible deformation work is performed on this occasion, i.e. impact energy is irreversibly translated into plastic deformation of the crimps 19. An intermediate stage of this deformation is shown in FIG. 4.

Figure 5:
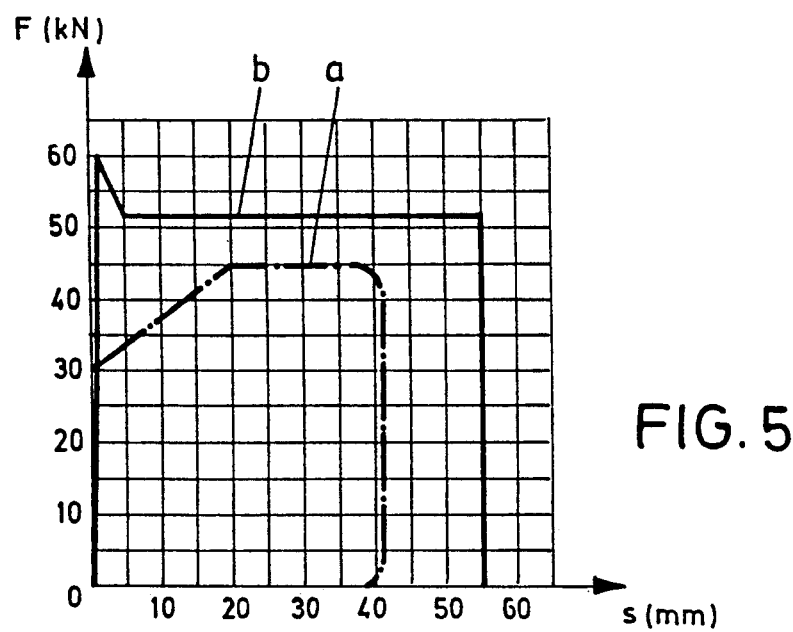
FIG. 5 is a displacement-force diagram of the damper.

In FIG. 5 a displacement-force diagram for the reversible impact damper A is marked with a. The displacement-force characteristic line of the deformation damper B is marked with b. As can be seen from the curve a, this characteristic line first ascends linearly; in this area the damping increases as a result of the compression of the solid 10. Then the damping is constant. The damping forces are always somewhat smaller than the equally substantially linear damping forces arising upon the deformation of the deformation damper B. It is thus ensured that the reversible damping always takes place first and that the deformation damper B is only brought into action when a predetermined maximally admissible value of energy to be damped is exceeded.

The dimension of the damping force of the deformation damper B according to the characteristic line b can be influenced by the number of the crimps 19, by the shape of the crimps 19, namely their depth and their profile, by the choice of the material of the slide tube 15, by the wall thickness c of the slide tube 15, by the shape of the deformation piston 18 in the area of its exterior circumference 2 and by a possible lubrication between the deformation piston 18 and the slide tube 15.

The bond of the slide tube 15 and of the suspension tube 16 gives rise to high stability and load-carrying capacity at right angles to the axis 3. This is important for a crash at an oblique angle.

As seen in FIG. 4, the entire damper can be compressed to such extent that the guide bush 14 with the slide tube 15 reaches the securing element 2. Therefore, it is advisable not to make the length L of the crimps 19 greater than the maximum displacement path of the guide bush 14 with the slide tube 15 in relation to the crimps 19. It must here be additionally mentioned that the displacement path s that can actually be travelled by the damping piston 18 on the crimps 19, which are thus deformed, is directly proportional to the energy to be translated by damping, as can also be taken from the diagram according to FIG. 5.

The crimps 19 can also change in cross-section in the direction of the axis 3, i.e. they can become wider or they may taper, so that increasing or decreasing damping forces result when the deformation piston 18 is moved over the crimps 19. In this case the displacement-force characteristic line b according to FIG. 5 does not extend horizontally but ascends or descends.

Such a crimp 19' tapering in the direction L is shown in dashed lines in FIG. 1. A crimp 19" widening in the direction L is shown in dot-dashed lines in FIG. 1.

A damper according to the invention can also be realized in that there is no impact damper A but only a deformation damper B. In this case the deformation plate is rigidly connected with the securing element 2, for instance by way of a tube corresponding to the housing 1.

What is claimed is:

1. An impact damper, in particular for vehicles, comprising:
   a reversible impact damper (A) with a housing (1) having a central longitudinal axis (3), with a damping medium, in particular a compressible solid (10), in said housing (1), with a piston rod (5) arranged displaceably in the direction of said axis (3) of said housing (1) and having a first end located outside said housing (1), and a second end located within said housing (1), to which second end a piston (4) is secured, which piston (4) introduces forces into said damping medium (10) to be absorbed by said damping medium (10);
   an irreversible deformation damper (B), with a slide tube (15) with an internal wall and being displaceable relative to said housing (1) in the direction of said axis (3), with projections (19) at said internal wall in the form of crimps (19, 19', 19") extending substantially parallel to said axis (3), being directed inwards to said axis (3), and being deformable outwards radially to said axis (3), with a deformation piston (18) resting against said first end of said piston rod (5) and against ends of said projections (19) facing the deformation piston (18); and securing elements (2, 17), being connected with said housing (1) on the one hand and with said slide tube (15) of said deformation damper (B) on the other hand.

2. An impact damper according to claim 1, wherein the deformation piston (18) has an essentially cylindrical exterior circumference (22) resting against the internal wall of the slide tube (15).

3. An impact damper according to claim 1, wherein the deformation piston (18) has a guide bevel (21) bearing against the ends of the crimps (19) facing the deformation piston (18).

4. An impact damper according to claim 1, wherein the slide tube (15) is surrounded by a suspension tube (16) and is firmly connected with the latter in the direction of the axis (3) and wherein a securing element (17) associated with the piston rod (5) is mounted to the suspension tube (16).

5. An impact damper according to claim 1, wherein the crimps (19) have essentially the same cross-section over their length (L).

6. An impact damper according to claim 1, wherein the crimps (19', 19'') taper over their length.

7. An impact damper according to claim 1, wherein the deformation piston (18) with the piston rod (5) and the housing (1) are in common displaceable relative to the slide tube (15).

8. An impact damper according to claim 7, wherein, bearing against the housing (1), the deformation piston (18) is displaceable through the slide tube (15).

* * * * *